United States Patent
Bushmitch et al.

(10) Patent No.: US 7,228,438 B2
(45) Date of Patent: Jun. 5, 2007

(54) COMPUTER NETWORK SECURITY SYSTEM EMPLOYING PORTABLE STORAGE DEVICE

(75) Inventors: Dennis Bushmitch, Somerset, NJ (US); Nasir Memon, Brooklyn, NY (US); Sathya Narayanan, Lawrenceville, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 803 days.

(21) Appl. No.: 10/001,687

(22) Filed: Oct. 23, 2001

(65) Prior Publication Data

US 2002/0159601 A1   Oct. 31, 2002

Related U.S. Application Data

(60) Provisional application No. 60/287,488, filed on Apr. 30, 2001.

(51) Int. Cl.
*H04L 9/32* (2006.01)
*H04L 9/00* (2006.01)
*G06F 15/16* (2006.01)

(52) U.S. Cl. .................. 713/193; 713/153; 726/12; 726/13

(58) Field of Classification Search ............. 713/193, 713/153; 726/12, 13
See application file for complete search history.

(56) References Cited

U.S. PATENT DOCUMENTS

| | | | |
|---|---|---|---|
| 5,301,247 A * | 4/1994 | Rasmussen et al. .......... 380/43 |
| 6,044,349 A * | 3/2000 | Tolopka et al. ................ 705/1 |
| 6,199,114 B1 | 3/2001 | White et al. | |
| 6,212,635 B1 * | 4/2001 | Reardon ..................... 713/165 |
| 6,317,838 B1 * | 11/2001 | Baize ......................... 713/201 |
| 6,510,464 B1 * | 1/2003 | Grantges et al. ............ 709/225 |
| 6,704,873 B1 * | 3/2004 | Underwood ................ 713/201 |
| 6,751,729 B1 * | 6/2004 | Giniger et al. ............. 713/153 |
| 6,928,558 B1 * | 8/2005 | Allahwerdi et al. ........ 713/172 |
| 6,970,853 B2 * | 11/2005 | Schutzer ...................... 705/67 |
| 6,971,005 B1 * | 11/2005 | Henry et al. ................ 713/155 |
| 2001/0056354 A1 * | 12/2001 | Feit et al. ....................... 705/1 |
| 2003/0135739 A1 * | 7/2003 | Talton, Sr. .................. 713/185 |
| 2004/0049702 A1 * | 3/2004 | Subramaniam et al. ..... 713/201 |
| 2004/0193921 A1 * | 9/2004 | Bryne ......................... 713/201 |

FOREIGN PATENT DOCUMENTS

EP   1 094 682 A1   10/1999

\* cited by examiner

*Primary Examiner*—Christopher Revak
*Assistant Examiner*—Kaveh Abrishamkar
(74) *Attorney, Agent, or Firm*—Harness, Dickey & Pierce, PLC

(57) ABSTRACT

The trusted computer network is protected behind a gateway that includes a bastion host and screening router which blocks all URLs associated with the trusted network. The bastion host includes a remote client authentication mechanism and web proxy component that verifies and translates incoming URL requests from authenticated remote clients. Authentication is performed using one-time passwords that are stored on a portable storage device. The user configures the portable storage device by operating configuration software from the protected side of the gateway. The portable storage device also stores plug-in software to enable the client computer to properly retrieve the one-time password and exchange authentication messages with the bastion host. Further security is obtained by basing the one-time password on an encrypted version of the user's PIN. A symmetric key used to encrypt the PIN is stored in a protected area within the portable storage device.

49 Claims, 12 Drawing Sheets

COMPUTER NETWORK SECURITY SYSTEM EMPLOYING PORTABLE STORAGE DEVICE

BACKGROUND AND SUMMARY OF THE INVENTION

The present invention relates generally to computer network security systems. More particularly, the invention relates to a security system that allows secure access by a remote authenticated user via a remote client that utilizes a portable storage device containing user-generated one-time passwords.

With the proliferation of computer network-propagated viruses and worms, and with the increasing frequency at which computer networks are being broken into, there is considerable interest today in computer security. Sophisticated network administrators construct secure firewalls to prevent such attacks. Less sophisticated system administrators, including most home network computer users, employ security measures that are far less robust. At present, many home computer networks are simply unprotected. Computer network security is a complex issue, and many home network users simply do not have the skill or training to ensure that their networks are free from attack.

The present invention provides a network security solution that is both highly secure and easy to use. The invention is thus ideal for home network security applications, where the network "administrator" may not necessarily have a great deal of training or experience in security issues.

The invention employs a portable storage device that maintains a set of one-time passwords. Using system software from a secure vantage point within the home network, the user generates a set of one-time passwords that are stored on the portable storage device. The portable storage device may then be installed in or connected to any remote client computer, giving that remote client computer the ability to establish and authenticate a secure connection with the home network. Each password is used only once, and session management software within the home network has the ability to limit a session to a predetermined length of time (e.g., 30 minutes). Although communication between home network and remote client is preferably over a secure channel, communication of the one-time password over this channel is further protected by using an encrypted version of the user's PIN number. The PIN number is encrypted at the remote client using a plug-in module that accesses a protected area within the portable storage device to retrieve the key used for this encryption.

The preferred embodiment takes the form of a home gateway that includes a firewall which functions as a screening router. The screening router screens out all requests to access content on the home network. All URLs associated with the home network are unreachable directly from the outside, and are thus maintained as protected URLs. The remote client, even after authentication, cannot issue URLs for the home network directly. Rather, upon authentication, a web proxy system is employed to communicate with the home network on behalf of the authenticated remote client. The proxy system works in conjunction with URL modification and URL verification processes. The URL verification process verifies the authenticity of the client, while the URL modification process gives the web proxy system the correct reference for the trusted domain resource. The URL modification process is unique for each authenticated client and for each authenticated session. Thus URLs that have been modified for a given authenticated client and for a given session cannot be re-used by other clients, or even for the same client during a later session.

In the preferred embodiment the authentication function is performed by a bastion host system forming part of the home gateway. The bastion host has software to perform the remote key authentication process by which the remote client authenticates itself using the one-time password obtained from the portable storage device. The bastion host also performs the URL verification and modification functions mentioned above.

The invention thus affords a high level of security in an easy-to-administer package. Everything a user needs to gain access to the home network from a remote client computer (except for knowledge of the user's personal identification number) is stored on the portable storage device. In a presently preferred embodiment the storage device also includes suitable browser plug-in software that supplies a remote client computer's browser with the capability of performing the authentication process, including the process of accessing and using the appropriate one-time password.

Unlike other security systems that rely on a trusted third party source for key distribution, the invention allows the user to create his or her own keys by operating configuration software at the trusted home network site. The user thus configures the portable storage device, supplying it with a set of one-time passwords using the configuration software.

The configuration software also installs a corresponding set of authentication codes in a secure database associated with the gateway. In this way, both the gateway and the portable storage device are provided with the corresponding keys needed to perform authentication. This solves the problem of how to securely distribute keys to a remote client, so that the remote client can then gain access to the home network.

For a more complete understanding of the invention, its objects and advantages, refer to the following specification and to the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
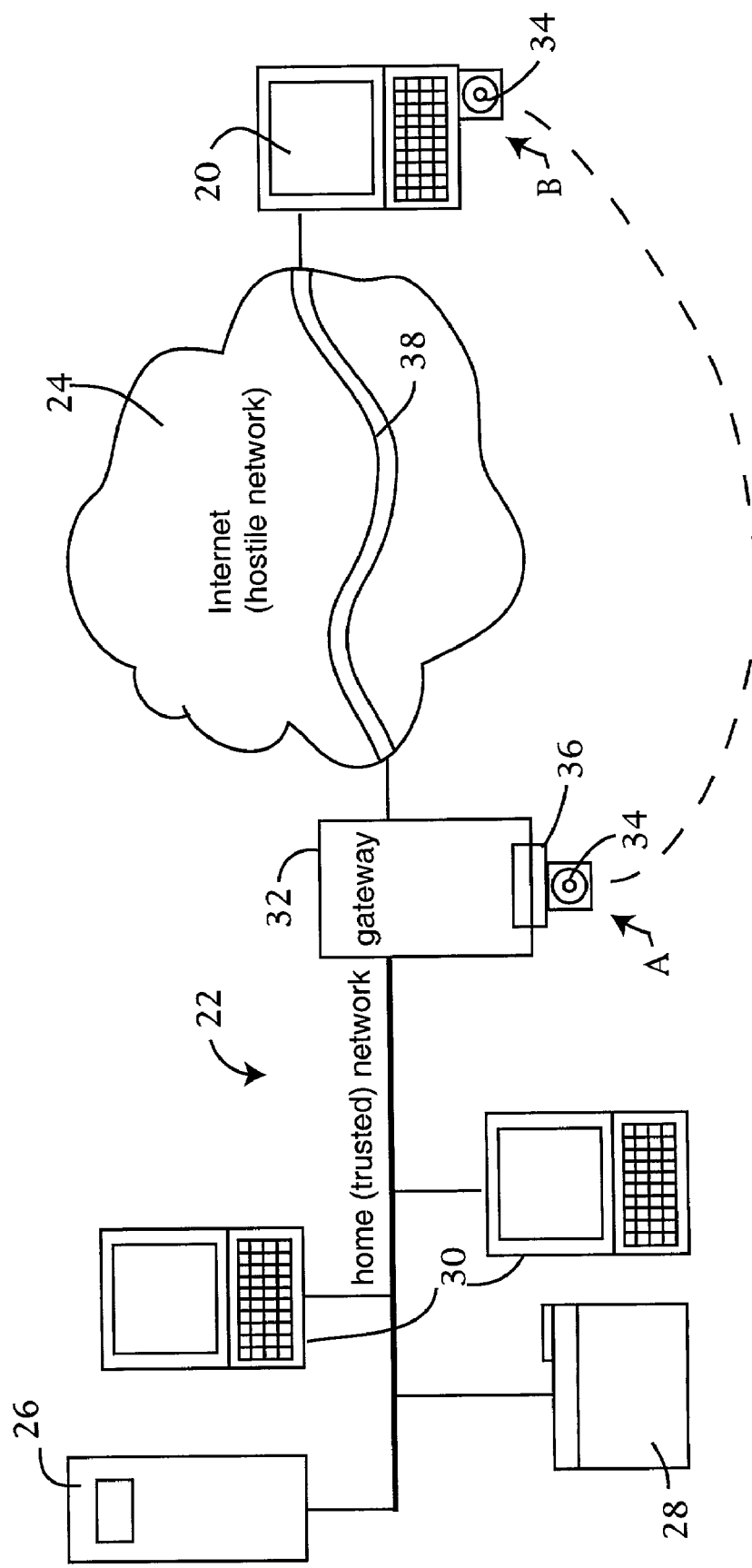
FIG. 1 is a system block diagram giving an overview of a presently preferred embodiment.

An exemplary implementation of the secure network access architecture is illustrated in FIG. 1. The remote client 20 communicates with the home network 22 via a hostile network, such as the internet 24. The home network 22 can be as simple as a single computer or as complex as a full scale local area network. Because the invention is particularly well suited for use by unsophisticated users, the home network illustrated in FIG. 1 comprises a fairly simple local area network including a server 26, a printer 28 and a pair of desktop or laptop computers 30. While a simple home network has been illustrated here, it will be appreciated that the principles of the invention can readily be extended to larger networks such as those found in offices, public agencies, universities and the like.

From a security standpoint, the home network 22 is a trusted network. In contrast, the internet 24 is a hostile network. The system operator of the home network has the ability to configure the home network so that only authorized users can access it and use its services. The home administrator does not have similar control over the internet 24. Therefore, to separate the trusted side from the hostile side, the present invention employs a gateway device 32. The details of the gateway device will be described more fully below. Essentially, the gateway functions as a gatekeeper, blocking all unauthorized access to the home network. The gateway device is also responsible for mediating the authentication process by which the remote client 20 authenticates itself so that it can gain access to the server 26 on the home network 22.

A key component of the authentication mechanism of the invention is a portable storage device 34. Two such devices are shown in FIG. 1, one being configured at A and one being used by the remote client at B. The gateway device includes a suitable memory recording apparatus 36 to initialize and configure the portable storage device. The portable storage device 34 can take a variety of forms, including CD ROM, DVD, CD-R. DVD-RAM, flash memory, and other hard disk-based media or solid state memories. A CD ROM embodiment has been illustrated in FIG. 1

According to one aspect of the invention, any portable storage device can act as a remote key storage mechanism. However, in the presently preferred embodiment, an additional level of protection is provided by including within the portable storage device a secure protected area. The details of this protected area will be discussed more fully below.

The portable storage device 34 functions as a secure key distribution mechanism. The user initializes and configures the portable storage device within the perimeter of the home network. More specifically, in the preferred embodiment the user accomplishes this using a secure interface to the portable storage device, defined within the gateway, and using secure software modules running on the gateway in a tightly controlled, secure fashion. In the preferred embodiment, the gateway includes a secure database in which the keys are also stored. This database is likewise a tightly controlled, secure entity that may be accessed only by secure software modules running on the gateway.

In the future, if secure components are developed to maintain interface and software module security across a distributed environment, the portable storage device initialization and configuration functions, and the secure database maintenance functions, may be implemented using computer systems within the trusted domain, other than the gateway.

After initialization, the portable storage device may then be taken by the user to any computer anywhere in the world. By installing the portable storage device in that computer (such as in the remote client 20), the computer is rendered capable of authenticating itself for communication with the home network 22. In the presently preferred embodiment the portable storage device is provided with one-time passwords during initialization. Thereafter, a plug-in program accesses these one-time passwords as will be more fully explained. The plug-in program may be a program module or applet suitable for use by web browser software already resident on the remote client 20. The plug-in software enables the remote client 20 to participate in the exchange of messages needed for authentication. The preferred embodiment uses the secure sockets layer (SSL) to establish a secure pipeline 38 through the internet 24.

Figure 2:
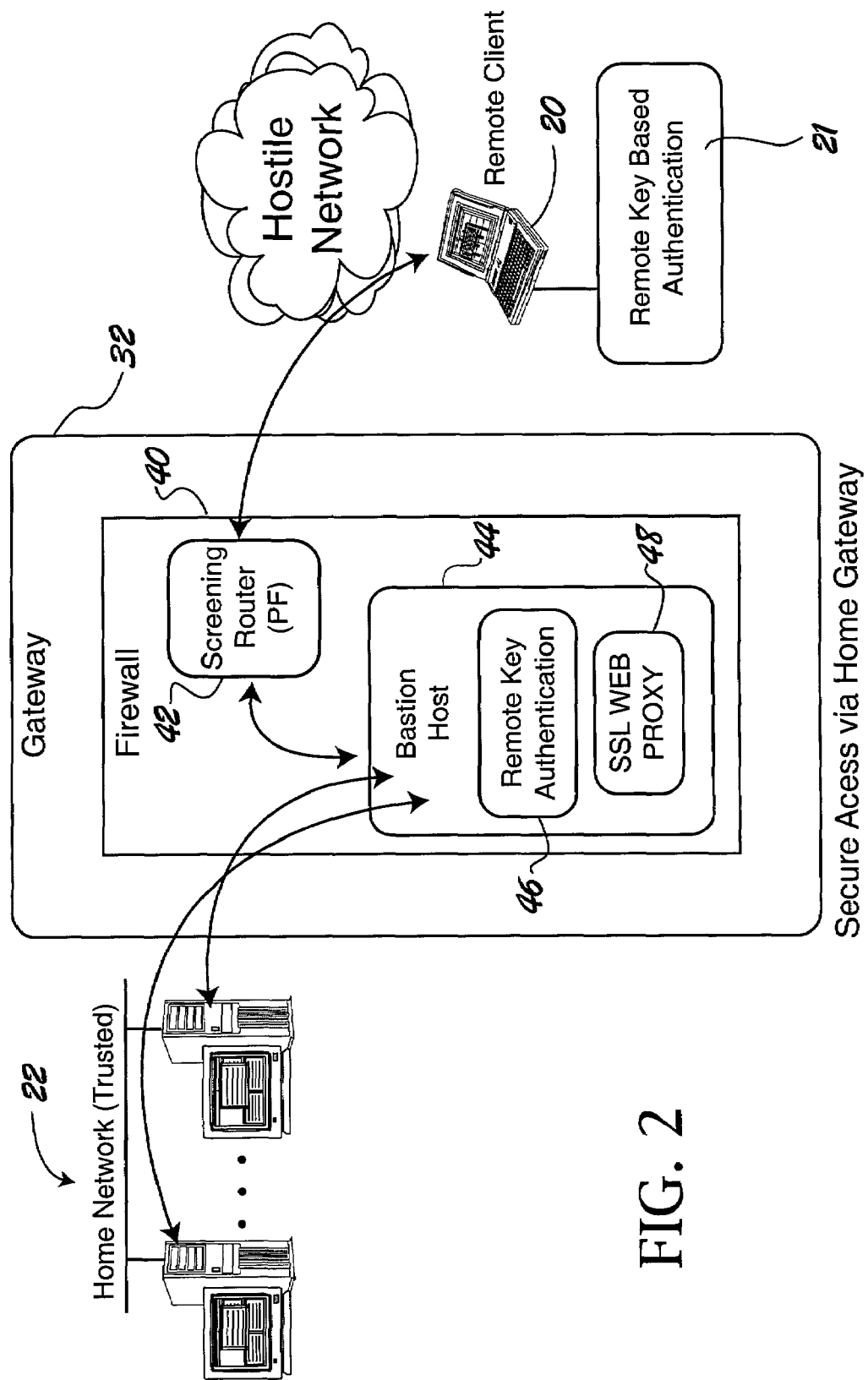
FIG. 2 is a block diagram of the system of FIG. 1, showing the basic structure of the presently preferred gateway.

Referring to FIG. 2, the gateway device 32 implements a firewall 40 that employs a packet filtering screening router 42. This router is configured to prohibit all remote clients from accessing any host on the home network 22 directly. The screening router in turn communicates with a bastion host 44 which performs the remote key authentication functions 46 and the web proxy functions 48, as will be more fully discussed below. Essentially, the bastion host 44 requires authentication, using the appropriate one-time password obtained from the portable storage device. To ultimately obtain information through the firewall, the remote client must successfully participate in the remote key based authentication process shown diagrammatically at 21.

Once authentication has been successfully completed, the bastion host performs URL address translation and client verification services as part of the web proxy functions 48. Specifically, URLs arriving from the remote client are verified as coming from the authenticated client, and then modified specifically for that client. The web proxy system consults active state middleware (ASMM 72, FIG. 4) to determine if there is an active state for that authorized client. If so, the web proxy system accesses the trusted home network on behalf of the remote client. Notably, the address translation function is specific for each client. Re-use of URLs is prohibited, thus thwarting a system attack where URLs for an authenticated client are intercepted and reused by an impostor. Further details of this process are described below in connection with FIG. 9.

Figure 3:
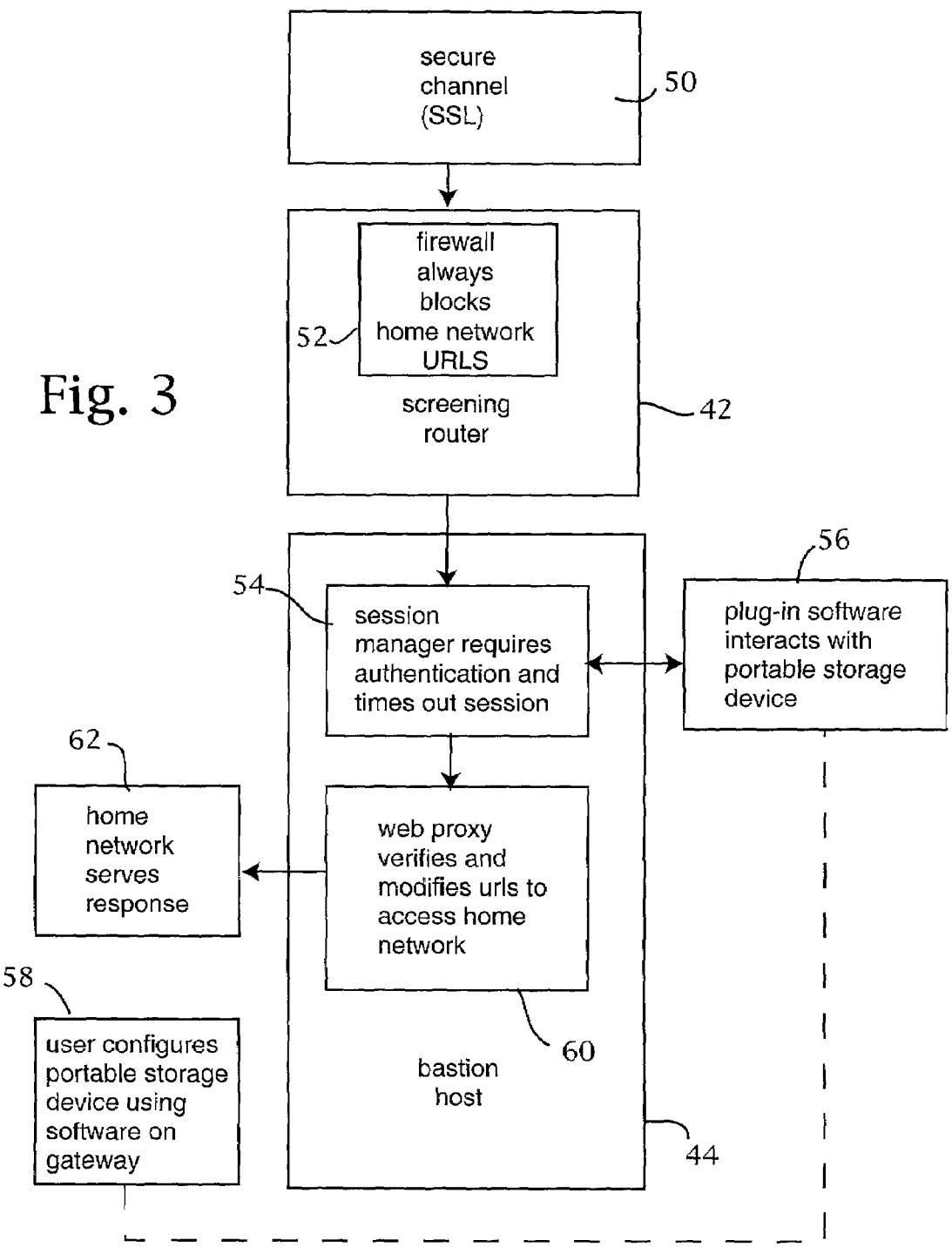
FIG. 3 is a data flow diagram useful in understanding the operation of the gateway illustrated in FIG. 2.

To better envision how a remote client is able to gain access to information stored on the home network, refer to FIG. 3. FIG. 3 presents a data flow diagram illustrating how the access to information on the home network is effected. The remote client establishes a secure channel 50, such as an SSL connection over the internet. The screening router 42 serves as a firewall that always blocks URLs associated with the home network as depicted at 52. The screening router 42 does allow certain communications to pass through the firewall, namely those needed for authentication and subsequent communication using the web proxy functions. Thus the screening router communicates with the bastion host 44, first, for session management and authentication, and second, for web proxy services after authentication.

The bastion host includes a session manager that requires authentication using a one-time password. For added security, the session manager also controls the length of the session by terminating the session after a predetermined time (e.g., 30 minutes). These control functions are illustrated at 54. The session manager performs the authentication function by interaction with the plug-in software within the portable storage device as depicted at 56.

The portable storage device is provided with one-time passwords as part of the user configuration depicted at 58. Specifically, the gateway generates random numbers and random keys which are then personalized for a specific user, using the user's PIN. The PIN thus becomes a factor in the encryption equation. Specifically, the PIN is exclusive-ORed (XOR) with the key $K_i$. To prevent discovery of the user's PIN through brute force attack, the preferred embodiment uses an encrypted version of the user's PIN as one of the factors needed to generate the one-time password. The value used to encrypt the user-supplied PIN is a special symmetric key $K_s$. $K_s$ is generated by the gateway and stored in a protected area within the portable storage device. Only a properly authenticated storage device, and a properly authenticated user of the portable storage device can access the protected area to retrieve $K_s$.

Specifically, the portable storage device must be authenticated by the reading device into which it is installed, inserted or attached, and the user must be authenticated by supplying the PIN—after being prompted by the plug-in module to enter it.

Once the session manager establishes an authenticated session, the requests for URL access are processed by URL verification and modification functions used in conjunction with the web proxy functions depicted at 60. The web proxy then communicates with the trusted home network, to obtain information or resources on behalf of the remote client, using the modified URLs, as verified and customized for the particular authenticated client.

Figure 4:
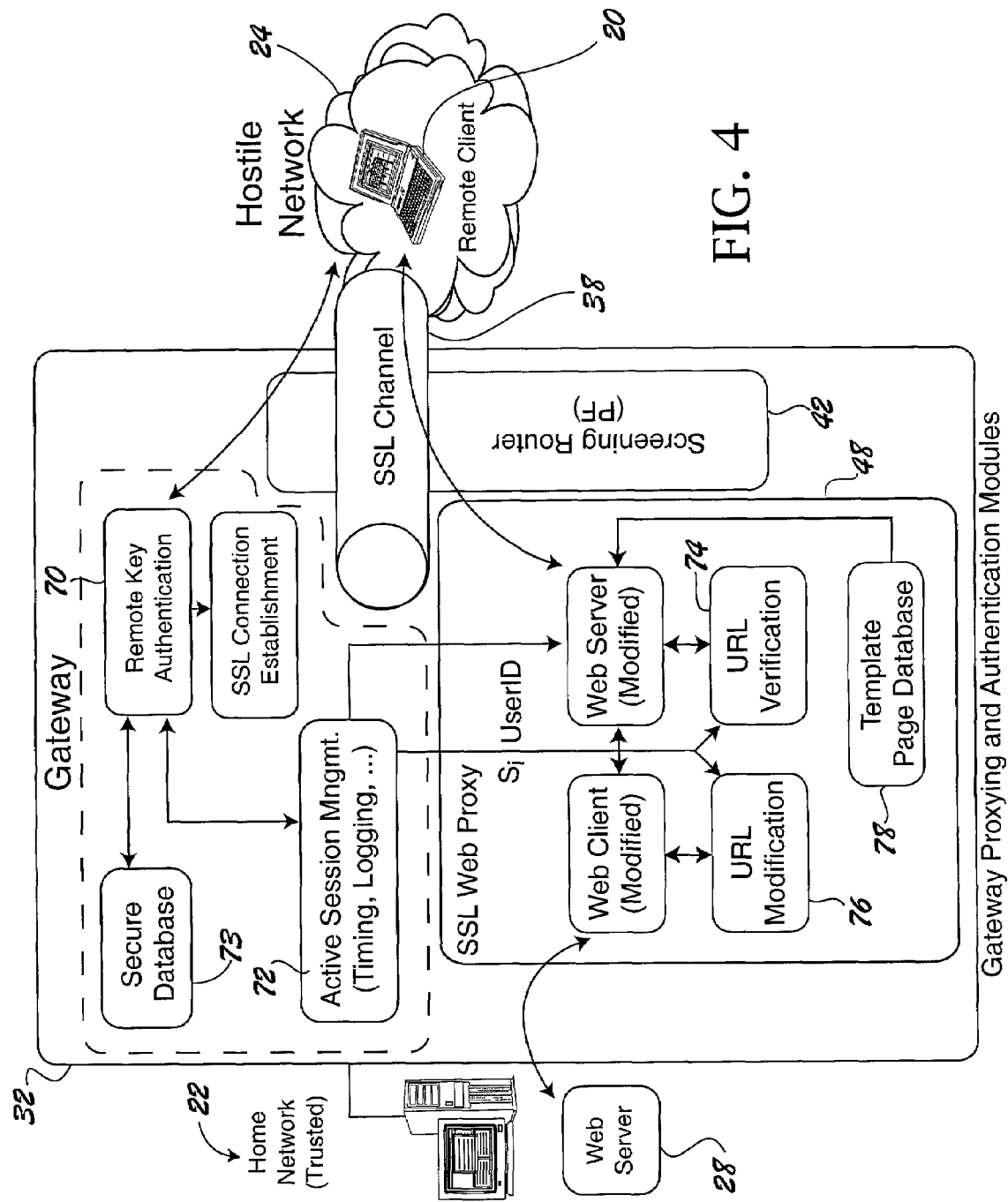
FIG. 4 is a block diagram of the gateway of FIG. 2, illustrating the authentication and proxy modules in greater detail.

The details of the gateway's proxying and client authentication module's interaction are shown in FIG. 4. In the presently preferred embodiment, the gateway 32 is the only machine with a valid certificate and the only host equipped with the SSL web proxy server 48. This SSL proxy server is the only entity used in all remote client accesses of the home content. The packet filtering policies deployed at the screening router are configured appropriately: only the https traffic directed at the web proxy is passed by a packet filter, all other traffic is rejected.

The process begins with the remote client 20 issuing the direct https URL request to a gateway. This request includes a User ID. At this point the remote client and gateway's remote key authentication module 70 take part in the authentication process based on use of a one-time password. The details of this authentication will be discussed in detail below.

Successful authentication creates a "client-gateway session state" (CGSS) in the active session management middleware (ASMM) 72 of the gateway. At the beginning of each session, a session duration timer associated with ASMM 72 is reset to zero (e.g., not to exceed W=30 minutes). The ASMM 72 then retrieves the user-specific parameters from a secure user database 73. This secure user database is secretly populated with information about the one-time passwords when the user configures the portable storage device (as at 58 in FIG. 3). This secret information and other CGSS parameters are used during the authentication and URL validation processes.

Specifically, after authentication ASMM 72 instructs the SSL web proxy components of the web proxy server 48 to do the appropriate web proxying combined with URL validation as at 74 and to perform the bi-directional URL modification processes as at 76. Those processes are described more fully below in connection with FIG. 10.

After the expiration of a user session (suggested 30 minutes), the web proxy system sends a custom page (from the templates page database 78) to the remote client, indicating that a new portable storage device-based authentication must take place. The remote user is also able to explicitly tear down the client-gateway session (CGSS), by issuing a request of the type:

https://gw_host/?UserID=db&TearDown=on

The ASMM 72 then tears down the client-gateway session state (CGSS) and instructs the web proxy system not to resume the "old" SSL session. A full SSL handshake has to be performed again by the client and the proxy to establish the new SSL session, perform the full round of portable storage device-based authentication, and create the new CGSS. It is important to note that once the CGSS is torn down, no proxying of the web content may occur in response to an "outside" request, since the requested URLs would fail their authenticated validations.

In the preferred embodiment, the gateway 32, with the proxy service running on it, is the only host which needs a valid IP address. The rest of home hosts may obtain their IP addresses from the internally managed address pool, using such mechanisms as DHCP and network address translation (NAT).

Figure 5:
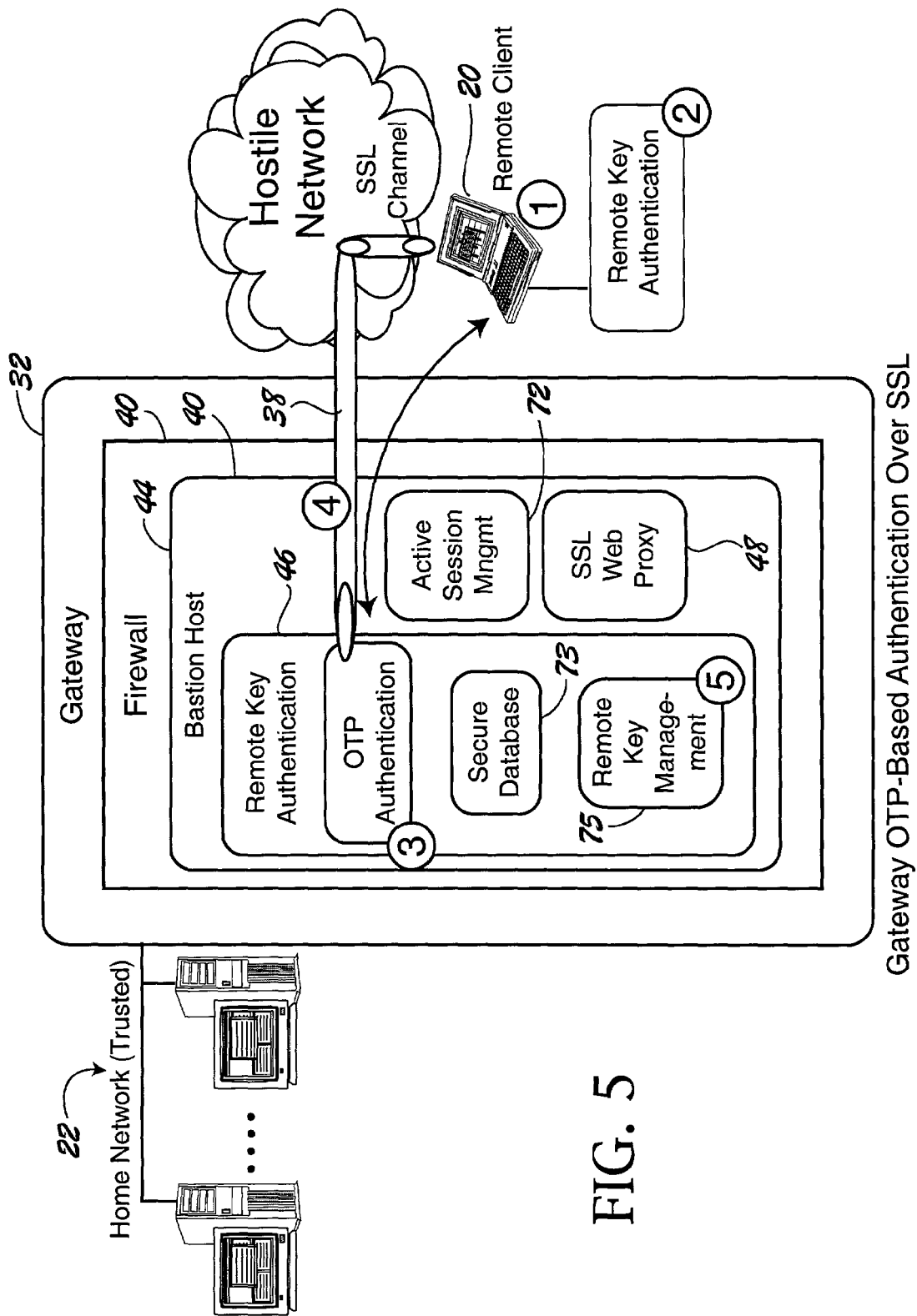
FIG. 5 is block diagram of the gateway of FIG. 2, illustrating the one time password authentication mechanism.

With the overall architecture of the presently preferred embodiment in mind, details of the preferred remote key authentication process will now be described with reference to FIGS. 5-8. Referring to FIG. 5, authentication is mediated by the remote key authentication module 46. The presently preferred embodiment uses at least 128 bit-strength ciphers, meaning that all session keys ($K_i$, $K_s$) should be at least 128 bits long. Prior to use, keys are generated by a key management system detailed below in connection with FIG. 11.

In the preferred embodiment we require a "true" random number generator for generation of random cryptographic parameters. Many of the security aspects of the proposed system depend on random sequences used as one-time passwords and keys for their encryption. Such generator could take into account, for example, external temperatures, information about networking connections and many other external sources, and combine these together using some strong hashing functions (e.g., MD5).

Figure 6:
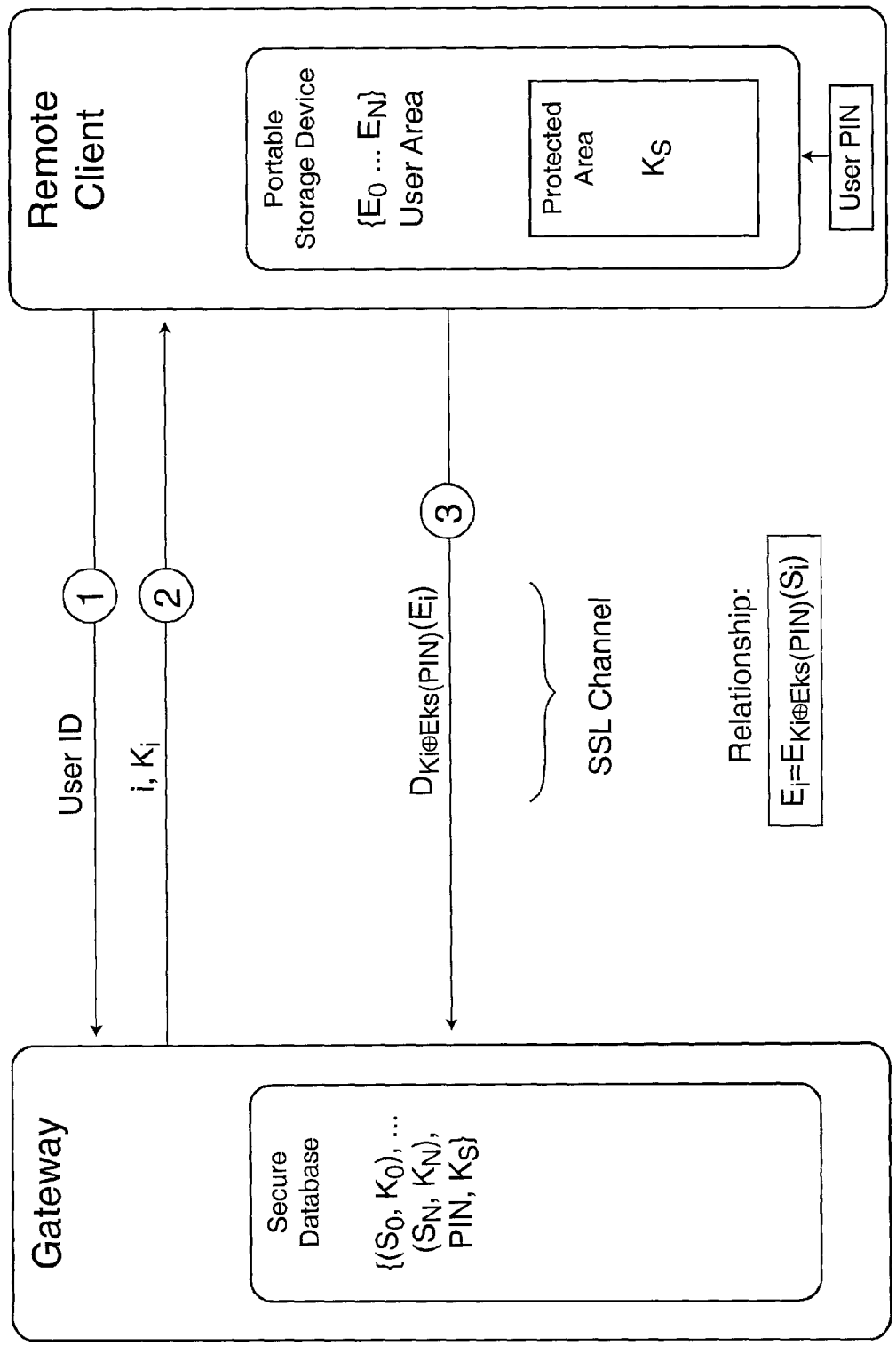
FIG. 6 is a block diagram giving a more detailed view of the presently preferred authentication process.
Figure 11:
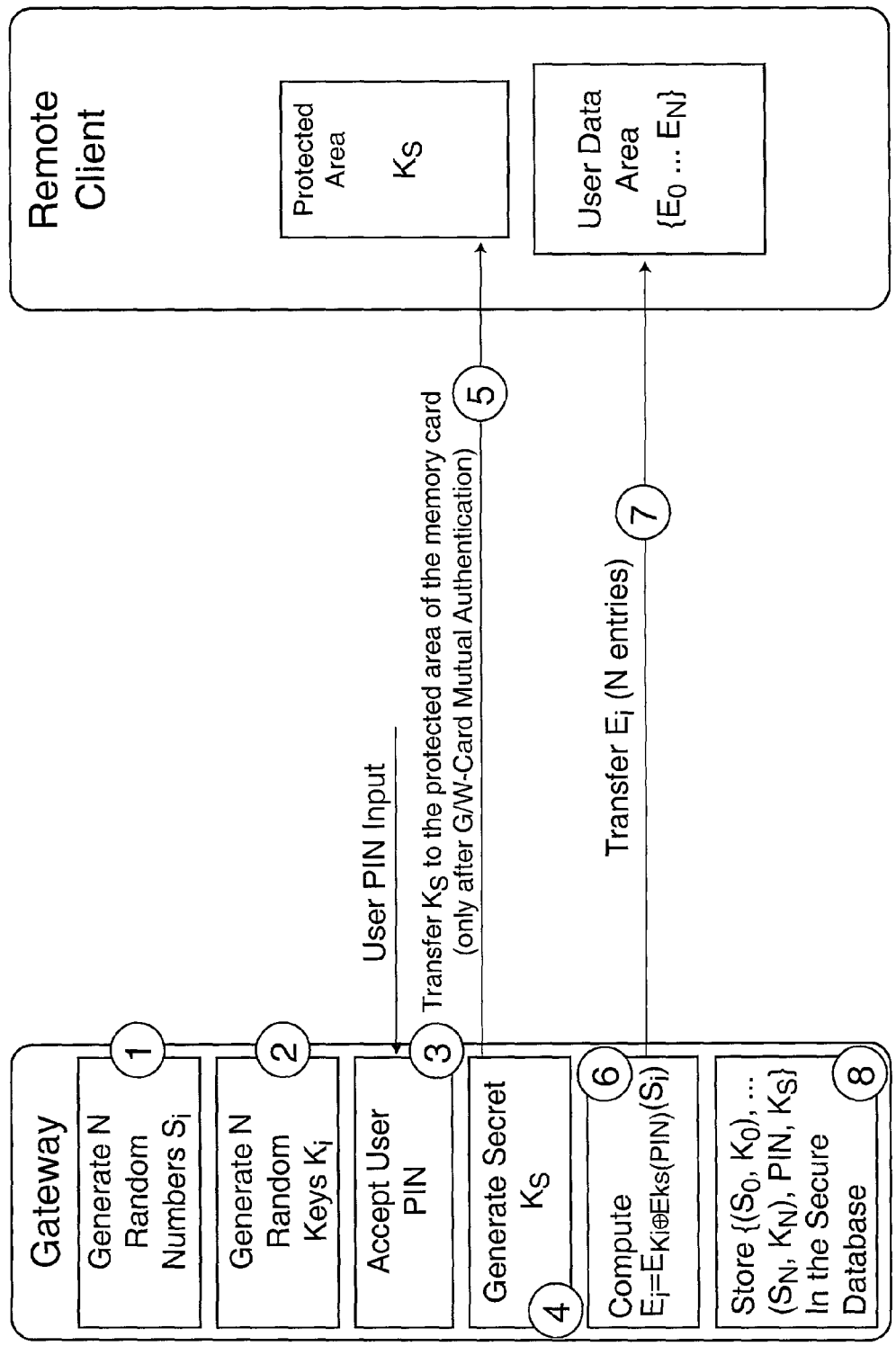
FIG. 11 illustrates the presently preferred process for initializing or configuring the portable storage device.

The portable storage device-based authentication process is shown in FIG. 6. During the remote key's initialization stage, the "future" remote user must be physically proximate to the home gateway. The user must insert the key card (or CD media) into the gateway for the initialization procedure and subsequent transfer of one-time passwords to the key card. Remote key card initialization process is depicted in FIG. 11 and is described in detail below. During this initialization stage, the gateway simply generates a set number (e.g., N=100) of random passwords ($S_i$), encrypts those with random keys ($K_i$) and makes them dependent on the user's knowledge of the 4-digit PIN (which is then protected by a symmetric key ($K_s$) stored in the protected area). These encrypted passwords ($E_i$) are then stored in the portable storage device that can be taken by the remote client on a trip. Passwords ($S_i$) and corresponding keys ($K_i$) are also stored in the gateway's secure database for access by the remote key authentication module 70 (FIG. 4).

Referring to FIG. 6, The authentication process then proceeds according to the steps enumerated as follows:

Step (1) Remote client submits its user ID to the gateway inside https request.

Step (2) Gateway sends the counter's value (i) to the remote client along with the value of corresponding key ($K_i$).

The gateway uses the counter (i) to index the number of successful user authentications. If N=100, the counter goes from 100 down to 1. When the counter reaches 0, no more authentications are allowed for a given user ID without re-initializing the key card.

Step (3) Client browser Plugin software decrypts the one time password ($E_i$) according to the expression: $S_i = D_{K_i \oplus E_{ks}(PIN)}(E_i)$. Plugin sends $S_i$ to the gateway's Key Card Authentication module.

At this point the remote key authentication module 70 (FIG. 4) compares the value $S_j$ received from the client with the one stored in its secure database 73 (FIG. 4). If they match, the ASMM 72 decrements the value of the usage counter (i) and establishes CGSS inside the gateway's ASMM 72 (FIG. 4).

A denial of service (DOS) attack would occur if an intruder were able to use up all the password space by simply submitting the User ID to the gateway multiple times. To prevent this the preferred embodiment decrements the counter only after a successful user authentication. In addition, we suggest a time window (W), within which a maximum of three authentication attempts is permitted. If the number of unsuccessful attempts reaches three, no further authentication attempts for a given user are permitted within this current W. The proposed length for the window W is 5 minutes.

Figure 7:
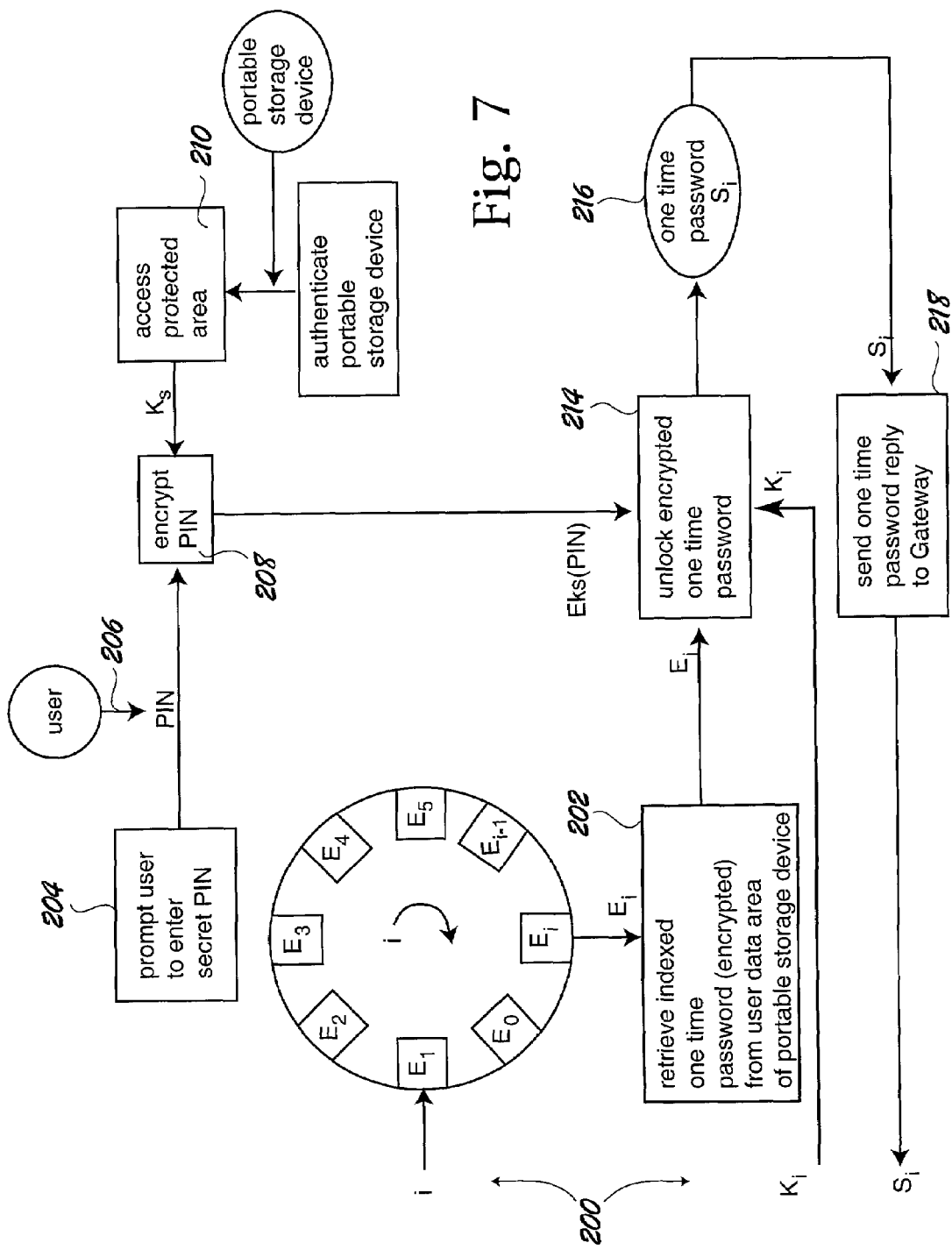
FIG. 7 is a data flow diagram useful in understanding the presently preferred authentication process.
Figure 8:
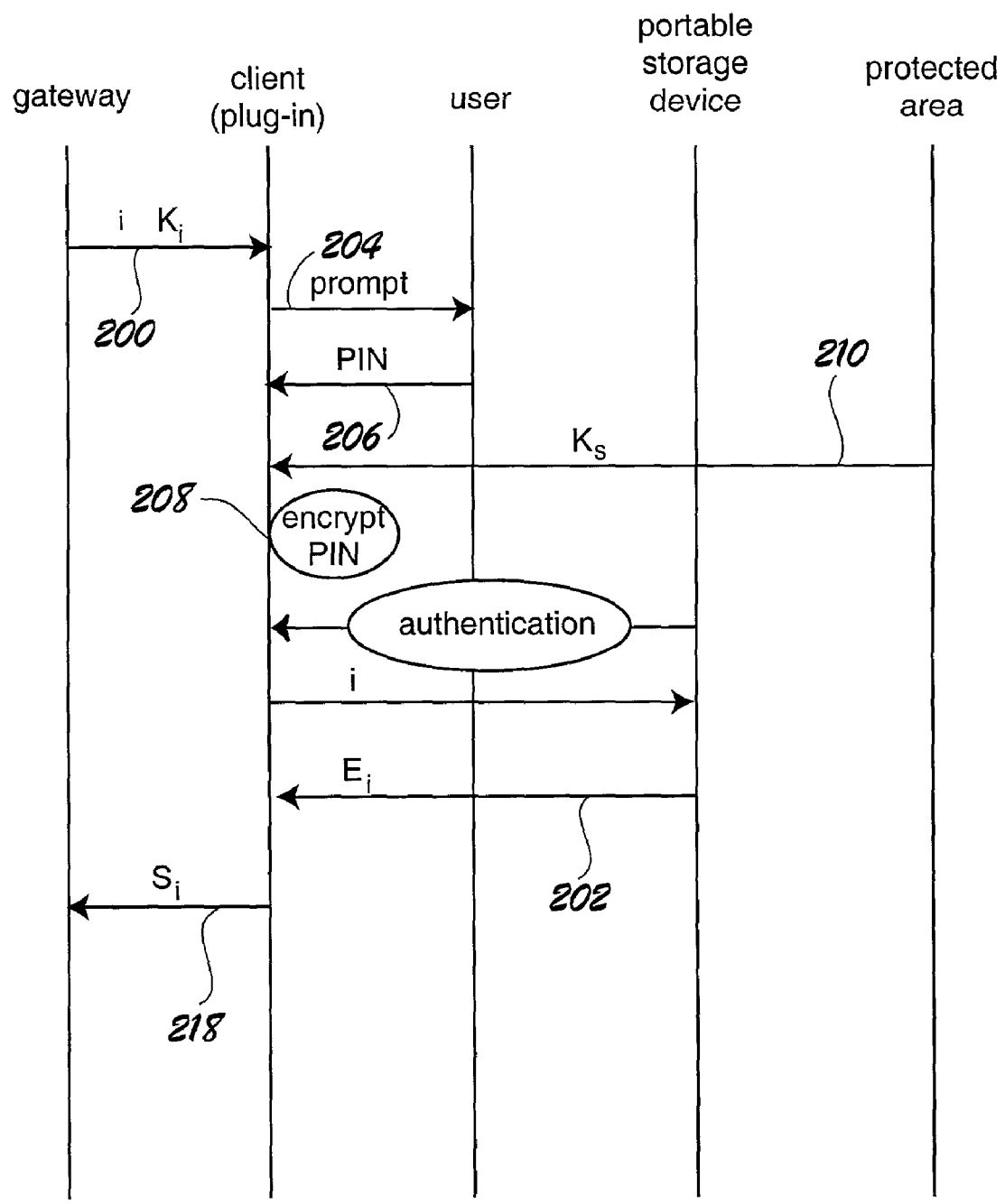
FIG. 8 is a sequence diagram further illustrating the authentication process.

For a more complete understanding of the authentication process, refer now to FIGS. 7 and 8. FIG. 7 illustrates the processing performed at the remote client once the appropriate information has been received from the gateway. FIG. 8 illustrates the same process at a somewhat higher level, showing the exchange of messages that are passed among the various entities that participate in the authentication process.

Communication between the remote client and the gateway begins with the remote client accessing a log-in page generated or served from pages stored in the template page database. This invokes the plug-in module, which then prompts the user to supply his or her log-in name or user ID. The user then enters his or her user ID, and this information is sent to the gateway where the ID is checked by the ASSM middleware and where the secure database is accessed to retrieve the values of i and $K_i$ that are appropriate for that user. Once these values are retrieved, the authentication process is ready to begin.

The authentication process begins with the gateway communicating the index number i and the key value $K_i$ to the remote client, which is operating using the plug-in module. In FIGS. 7 and 8 this first exchange of information (i, $K_i$) is illustrated at 200. The plug-in module uses the index value i to index into the table of one-time passwords, $E_1 \ldots E_N$. Note that these are encrypted passwords. In FIG. 7 encrypted password $E_i$ is retrieved by the plug-in module at 202.

Meanwhile, the plug-in module prompts the user to enter his or her secret PIN number as at 204. The user then enters the secret PIN at 206. In the preferred embodiment, the user's PIN is not used in its plaintext form. Instead, the PIN is encrypted and the encrypted PIN is then used as one factor in generating the key needed to unlock the encrypted one-time password. As shown at 208, the user's PIN is encrypted using the value $K_s$ which is stored in the protected area within the portable storage device. Access to the protected area is gained only upon authentication of the portable storage device.

The plug-in module retrieves the encrypted session key $K_s$ at 210 and then uses it at 208 to encrypt the user-supplied PIN. At this stage in the process the plug-in module thus has the three pieces of information it needs to generate the one-time password, namely $K_s$, $E_i$ and $K_i$. The index value i is used to retrieve a selected one of the encrypted one-time passwords $E_i$ at 202. The encrypted PIN $E_{Ks}$ is combined through an exclusive-OR (XOR) operation with the value $K_i$ and the result is used to decrypt the encrypted one-time password $E_i$. The decryption process is shown in FIG. 7 at 214. The decryption process generates a single one-time password $S_i$, shown in FIG. 7 at 216. This one-time password is then sent back to the gateway at 218. The gateway is then able to compare the one-time password with the stored one-time passwords within its secure database (secure database 73 of FIG. 4) to verify that the remote client is authorized to proceed with secure communication.

Figure 9:
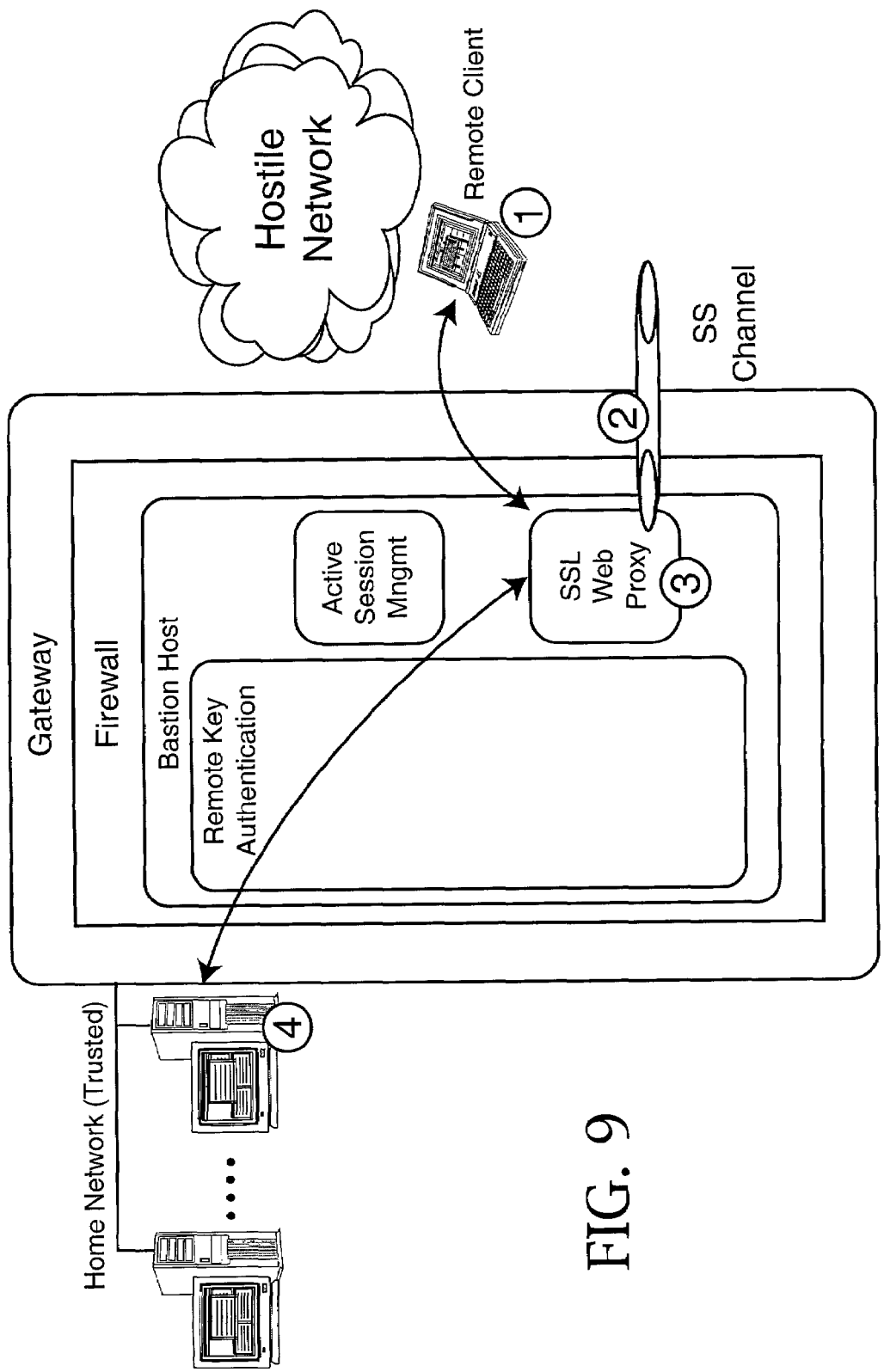
FIG. 9 is a block diagram of the gateway of FIG. 2, illustrating the web proxy function of the preferred embodiment.
Figure 10:
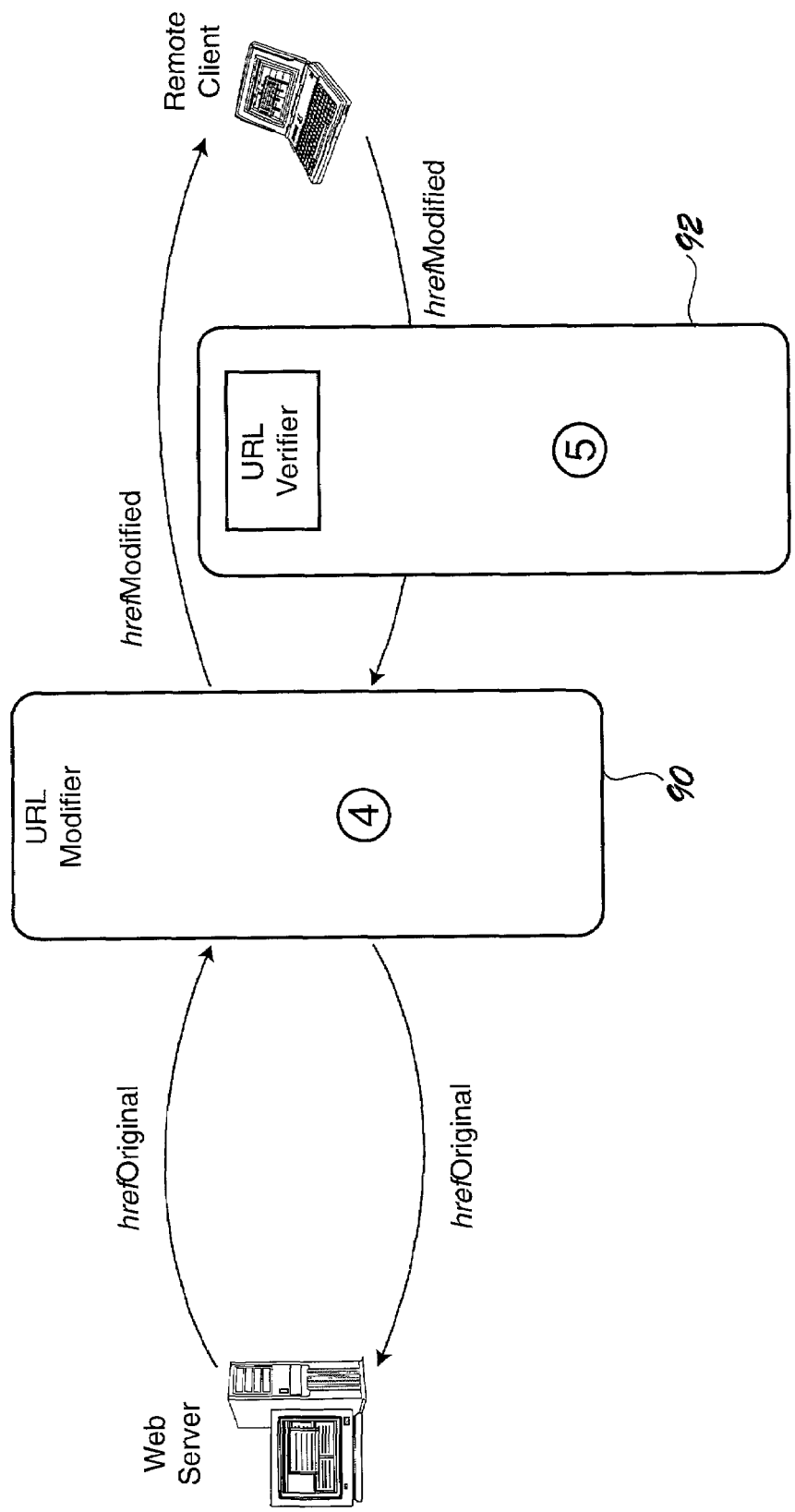
FIG. 10 is a block diagram of components of the web proxy module, illustrating the uniform resource locator (URL) verification and modification functions.

As previously noted, all direct communication with the secure trusted network is blocked by the screening router 40. Only the proxy system has access to the trusted network, and it will obtain information and services on behalf of a remote client, only after proper authentication has occurred. In performing its task, the proxy system uses the URL validation and URL modification services. The details of these validation and modification services are shown in FIGS. 9 and 10.

Despite the fact that the communication between the remote client and the home host is protected by the SSL-based encryption, we propose to further strengthen security in a way that guarantees that only the properly authenticated client could be the party capable of issuing a valid URL. This approach will "bullet proof" all URLs, even if the SSL channel is compromised by an intruder.

As each web page passes through a web proxy toward the remote client, each internal to the home site URL href reference is rewritten by the URL modification module 90 FIG. 10 in a fashion shown below:

https://gateway_host/home_host/MSB/$_{64}${MD5$_{128}$ ((Original_URL|| User_ID)⊕$S_i$}/Original_URL/?UserID=db, where $S_i = D_{K_i \oplus E_{ks}(PIN)}(E_i)$ This reference then becomes the URL, which the remote client receives and subsequently would issue within its requests to the web proxy server. The overall process is shown in FIG. 10. When the modified URL arrives from the remote client to the gateway, the URL verification (validation) module 92 verifies its authenticity. The URL modification module then translates the URL into its regular form:

http://home_host/Origina_URL

This then becomes the request that the web proxy issues over the trusted home network. Note that the URL modification process is bi-directional. Incoming URLs from the remote client are modified specifically for that client (upon authentication). Similarly, outgoing URLs sent to the remote client are also modified using the same modification rules.

Given that $S_i$ is only valid for a given remote client session (W=30 minutes), even if the underlying SSL connection is compromised, URLs obtained by the intruder are worthless for referencing within any future sessions.

The portable storage device by which one-time passwords are securely distributed to a remote client forms an important part of the network security system. As noted above, the system is designed to allow the user to conveniently configure his or her own portable storage device using initialization and configuration software deployed at the gateway. The details by which the portable storage device is configured will now be described in connection with FIG. 11.

Before the user can login from the remote location, he or she needs to initialize the portable storage device (remote key) by inserting it into a the recording apparatus 36 on gateway 32. CD/DVD media is being used as portable storage, the gateway must be equipped with a CD/DVD writer capable of storing information into "user" and "protected" areas on the portable media. The process is shown in FIG. 11. The remote key management module 70 (FIG. 4) performs the remote key initialization process.

During each portable storage device initialization process, the gateway (FIG. 11, step (1)) generates a set number (N) of user one-time passwords ($S_i$). These are simply the random numbers obtained from the random number generator. In addition, the gateway generates N random keys ($K_i$) and forms pair associations between each one-time password and each key (FIG. 11, step (2)).

In step (3), the gateway's remote key management module obtains a User PIN from the authentication plug-in software at the user side, generates random $K_s$ (step (4)), authenticates the key card, and stores $K_s$ within the protected area of the portable storage device (step (5)).

In step (6) the gateway's remote key management module 75 (FIG. 5) computes the value of $Ei=E_{Ki \oplus Eks(PIN)}(S_i)$ for each pair association ($S_i$, $K_i$). These values are then stored in the user data area of the portable storage device in step (7).

Finally, the user's ID, user's PIN, $K_s$, and OTP key-password pairs ($S_i$, $K_i$) are stored in the secure database 73 (FIG. 4) for future reference by the Remote Key Authentication 70 and ASMM 72 modules (see FIG. 4). If any of the above steps fails for any reason, the overall portable storage device initialization process fails.

Once the portable storage device has been initialized with keys, the user can take it to any suitably equipped computer, anywhere in the world, and engage in secure client-server communication with the gateway. In the presently preferred embodiment, the remote client computer uploads or installs a plug-in software module (carried by the portable storage device, for example). The plug-in software module configures the client computer to participate in the exchange of messages needed to effect authentication. The plug-in software module also allows the remote client computer to generate the appropriate one-time password by selecting and decrypting one of the passwords stored on the portable storage device using a key generated using information from the gateway and the user's PIN. In the preferred embodiment an encrypted version of the user's PIN is used to generate the key needed to decrypt the selected one time password. The user's PIN, supplied as plaintext by the user, is encrypted using a session key stored in the protected area within the portable storage device. Basing the authentication on an encrypted PIN makes the preferred embodiment more secure, by reducing system vulnerability to a brute force attack upon information communicated over the secure SSL channel.

Figure 12:
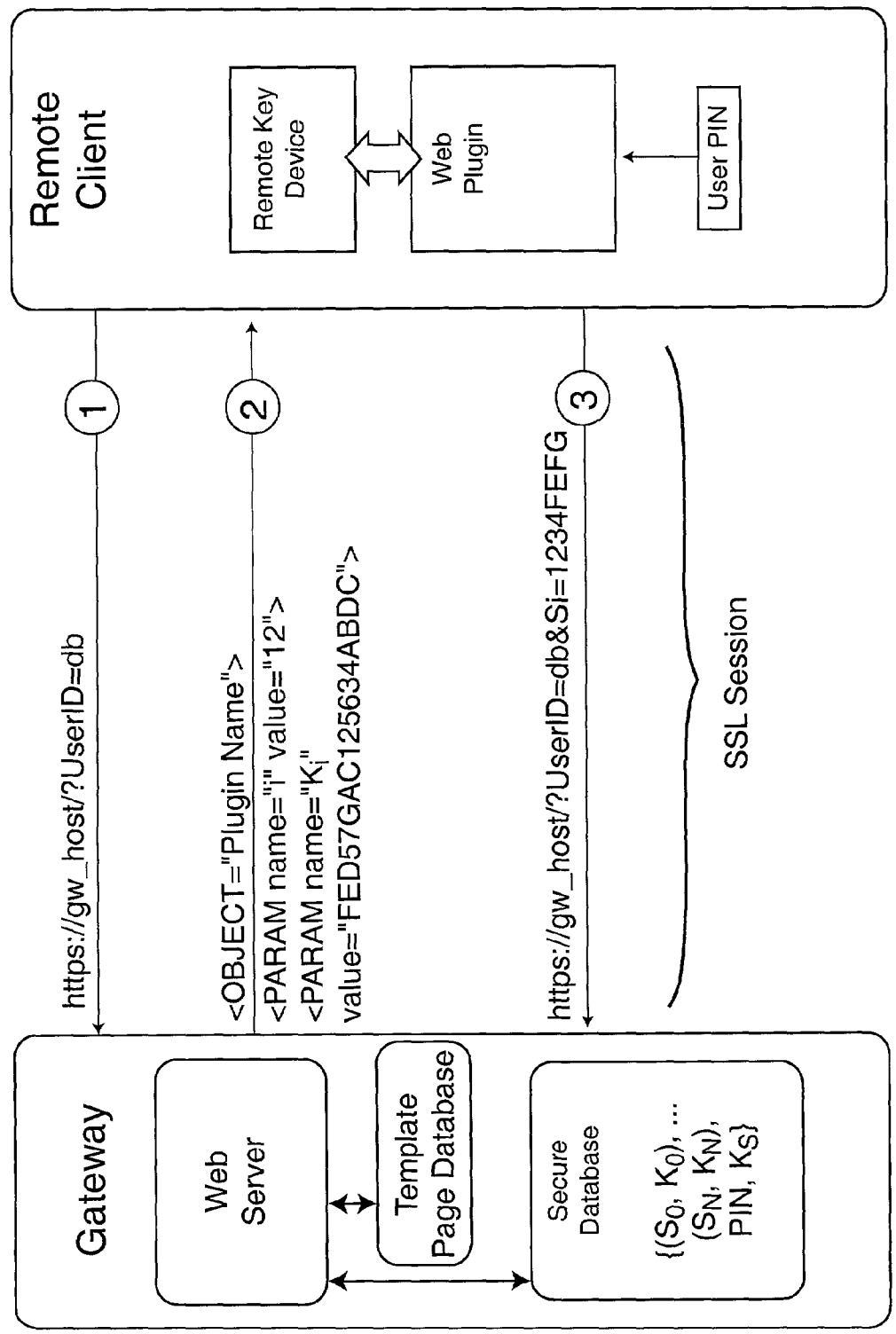
FIG. 12 is a block diagram giving a more detailed view of the manner of utilizing the client browser plug-in for authentication.

The preferred embodiment is designed to prevent any modifications to the remote client's Web browser. However, in order for a client to perform the portable storage device-based authentication process described earlier, the browser would require the help from a plug-in module, capable of accessing the portable storage device and performing some auxiliary cryptographic computations. FIG. 12 shows the browser-Plugin-gateway interaction in detail.

In FIG. 12, step (1) the remote client submits the query to the gateway, indicating its need to establish the SSL session for a subsequent OTP exchange and including the client's User ID.

https://gw_host/?UserID=user_name

In step (2), the remote key authentication module 70 FIG. 4 responds with the page containing the <OBJECT> tag, indicating the Plugin's name and the values of (i) and ($K_i$), passed as plug-in's parameter strings. At this point the Plugin "pops up" a user widget, asking the client for his or her PIN. It then accesses the values of $E_i$ and $K_s$ from the protected area of the portable storage device, computes the value of the one-time password:

$S_i = D_{Ki \oplus Eks(PIN)}(E_i)$

This value is send back to the remote key authentication module via the same SSL channel in step (3):

https://gw_host/?UserID=db&Si=123456789ABCD-EF0FEDCBA9876543210.

Preferably, the plug-in module should be signed by the manufacturer of the gateway, and be tamper-resistant. Use of cookies is also possible. The cookie, for example, may be modified by the client's helper application, which participates in the user authentication.

From the foregoing, it will be appreciated that the invention provides a user-friendly, convenient and yet highly secure system for effecting secure communication with a computer system or computer network. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A security system for controlling access to a trusted computer network by a client computer, comprising:
    a bastion host that controls access to said trusted computer network;
    a first data store associated with said bastion host and configured to store a set of key-password pairs;
    a portable storage device;
    a second data store associated with said portable storage device and configured to store passwords represented in said key-password pairs;
    a user operable initialization mechanism that interfaces with said first and second data stores, said initialization mechanism generating and storing said key-password pairs in said first data store and generating and storing said passwords in said second data store;
    an authentication mechanism having a first component associated with said bastion host and having a second component associated with said client computer;
    said first component being configured to communicate a password-specific key associated with one of said key-password pairs to said second component;
    said second component being configured to access said second data store and retrieve at least one password represented in said key-password pair;
    said second component being further configured to communicate said at least one password to said first component based on input from the user and based on said password-specific key communicated from said first component;

wherein said second component is further configured to prompt a user to provide an identification value, retrieve a symmetric key from a protected area within said portable storage device that is only accessible upon authentication of said portable storage device, produce an encrypted identification value by encrypting said second identification value with said symmetric key, and retrieve the password by decrypting a corresponding encrypted value in said second datastore using a combination of the encrypted identification value and the password-specific key.

2. The system of claim 1 further comprising a key management system that encrypts and stores said passwords in said second data store.

3. The system of claim 1 wherein said passwords stored in said second data store are encrypted and said second component is configured to decrypt and communicate said at least one password to said first component.

4. The system of claim 1 wherein said portable storage device is a non-volatile memory device.

5. The system of claim 1 wherein said portable storage device is an optical disk.

6. The system of claim 1 further comprising a screening router system that blocks interaction with said trusted computer network.

7. The system of claim 6 further comprising a proxy system that integrates with said screening router to permit interaction with said trusted computer network under control of said authentication mechanism.

8. The system of claim 1 further comprising a session management system that restricts interaction with said trusted computer network to an authenticated active session.

9. The system of claim 1 further comprising a session management system that restricts interaction with said trusted computer network to predetermined time duration.

10. The system of claim 1 further comprising a plug-in module stored on said portable storage device and accessible to said client computer to provide said client computer with instructions in implementing said second component of said authentication mechanism.

11. A security system comprising:
a gateway device situated between a trusted network and an untrusted network, which stores a set of N password-key pairs, N being an integer greater than one;
a portable storage device that stores a set of N encrypted values; and
a remote client that communicates with said gateway device via the untrusted network and accesses said portable storage device,
wherein said remote client receives a password-specific key of one of said set of password-key pairs from said gateway device, requests an identification value from a user, decrypts a corresponding encrypted value from said set of encrypted values using a combination of said identification value and said password-specific key, and transmits a result of said decryption to said gateway device, and wherein said gateway device authenticates said remote client if said result is equal to a password of said one of said set of password-key pairs;
wherein said remote client requests a first identification value from a user and sends it to said gateway device as a condition precedent to receipt of an index value and the password-specific key of one of said set of password-key pairs from said gateway device, receives the index value and the password-specific key from said gateway device, requests a second identification value from the user, retrieves a symmetric key from a protected area within said portable storage device that is only accessible upon authentication of said portable storage device, produces an encrypted identification value by encrypting said second identification value with said symmetric key, uses the index to identify a corresponding encrypted value from the set of encrypted values, and decrypts the corresponding encrypted value using a combination of the encrypted identification value and the password-specific key.

12. The security system of claim 11 wherein said gateway device includes an initialization module that generates said set of password-key pairs.

13. The security system of claim 11 wherein said gateway device includes an initialization module that generates said set of encrypted values.

14. The security system of claim 13 wherein said initialization module requests said identification value from the user, and generates said set of encrypted values from said identification value and said set of password-key pairs.

15. The security system of claim 14 wherein said initialization module generates each of said set of encrypted values by encrypting a respective password of said set of password-key pairs with a combination of a respective key of said set of password-key pairs and said identification value.

16. The security system of claim 15 wherein said combination of said respective key and said identification value includes a function of said respective key and said identification value encrypted with a symmetric key.

17. The security system of claim 16 wherein said function is a bitwise exclusive-or.

18. The security system of claim 11 wherein said set of password-key pairs is numbered, said one of said set of password-key pairs is associated with an index number i, said gateway device sends said index number i to said remote client, and said corresponding encrypted value is selected from said set of encrypted values using said index number i.

19. The security system of claim 11 wherein said gateway device filters out all packets bound for the trusted network, except for packets from said remote client once said remote client has been authenticated by said gateway device.

20. The security system of claim 11 wherein said gateway device revokes authentication of said remote client after a predetermined period.

21. The security system of claim 11 wherein said gateway device and said remote client communicate using a Secure Sockets Layer connection.

22. The security system of claim 11 wherein said combination of said identification value and said key includes a function of said key and said identification value encrypted with a symmetric key.

23. The security system of claim 2 wherein said function is a bitwise exclusive-or.

24. The security system of claim 11 wherein said gateway device uses each of said set of password-key pairs at most once.

25. The security system of claim 11 wherein said gateway device includes an initialization module that generates said set of password-key pairs and said set of encrypted values, and stores said set of encrypted values into said portable storage device when said portable storage device is-within a perimeter of said trusted network.

26. The security system of claim 11 wherein said portable storage device is associated with a user identifier, said remote client communicates said user identifier to said gateway device, and said gateway device stores a set of password-key pairs for each user identifier.

27. A security method comprising:
storing a set of N password-key pairs in a gateway device situated between a trusted network and an untrusted network, N being an integer greater than one;
storing a set of N encrypted values in a portable storage device;
placing the portable storage device in communication with a remote client;
communicating between the remote client and the gateway device via the untrusted network;
sending a password-specific key_of one of said set of password-key pairs to the remote client;
requesting an identification value from a user of the remote client;
creating a combination of said identification value and said password-specific key;
decrypting a corresponding encrypted value from said set of encrypted values using said combination;
transmitting a result of said decryption to the gateway device;
authenticating the remote client if said result is equal to a password of said one of said set of password-key pairs;
further comprising requesting said identification value from the user, and wherein said generating includes generating said set of encrypted values from said identification value and said set of password-key pairs;
wherein said generating includes generating each of said set of encrypted values by encrypting a respective password of said set of password-key pairs with a combination of a respective key of said set of password-key pairs and said identification value;
wherein said generating includes encrypting said identification value with a symmetric key;
further comprising storing the symmetric key in a protected area of the portable storage device that is only accessible upon authentication of the portable storage device; and
encrypting the identification value with the symmetric key stored on the portable device prior to said creating the combination, said decrypting, and said transmitting.

28. The method of claim 27 further comprising generating said set of password-key pairs.

29. The method of claim 27 further comprising generating said set of encrypted values.

30. The method of claim 27 wherein said generating includes combining said encrypted identification value with said respective key using a bitwise exclusive-or.

31. The method of claim 27 further comprising:
assigning each of said set of password-key pairs an index number, wherein said one of said set of password-key pairs is associated with an index number i; sending said index number i to the remote client: and selecting said corresponding encrypted value from said set of encrypted values using said index number i.

32. The method of claim 27 further comprising filtering out all packets bound for the trusted network, except for packets from the remote client once the remote client has been authenticated by the gateway device.

33. The method of claim 27 further comprising revoking authentication of the remote client after a predetermined period.

34. The method of claim 27 further comprising establishing a Secure Sockets Layer connection between the gateway device and the remote client.

35. The method of claim 27 wherein said creating includes evaluating a function of said key and said identification value encrypted with a symmetric key.

36. The method of claim 35 wherein said function is a bitwise exclusive-or.

37. The method of claim 27 wherein said sending uses each of said set of password-key pairs at most once.

38. The method of claim 27 further comprising generating said set of password-key pairs and said set of encrypted values, and storing said set of encrypted values into the portable storage device when the portable storage device is within a perimeter of said trusted network.

39. The method of claim 27 wherein the portable storage device is associated with a user identifier, and further comprising communicating said user identifier to the gateway device, and storing a set of password-key pairs in the gateway device for each user identifier.

40. A gateway device situated between a trusted network and an untrusted network, comprising:
a firewall module that restricts access to the trusted network;
a storage module that stores a set of N password-key pairs, N being an integer greater than one;
an initialization module that generates said set of password-key pairs, requests an identification value from a user, generates a set of N encrypted values from said set of password-key pairs and said identification value, and is capable of communicating said set of encrypted values to a portable storage device when the portable storage device is in secure communication with said gateway device;
an authentication module that sends a password-specific key of one of said set of password-key pairs to a remote client over the untrusted network, receives a decryption result from the remote client, and authenticates the remote client if said decryption result is equal to a password of said one of said set of password-key pairs;
wherein said initialization module generates each of said set of encrypted values by encrypting a respective password of said set of password-key pairs with a combination of a respective key of said set of password-key pairs and said identification value;
wherein said combination of said respective key and said identification value includes a function of said identification value encrypted with a symmetric key and said respective key; and
wherein said initialization module stores the symmetric key in a protected area of the portable storage device that is only accessible upon authentication of the portable storage device.

41. The gateway device of claim 40 wherein said function is a bitwise exclusive-or.

42. The gateway device of claim 40 wherein said set of password-key pairs is numbered, said one of said set of password-key pairs is associated with an index number i, and said authentication module sends said index number i to the remote client.

43. The gateway device of claim 40 wherein said firewall module filters out all packets bound for the trusted network, except for packets from the remote client once the remote client has been authenticated.

44. The gateway device of claim 40 wherein said authentication module revokes authentication of the remote client after a predetermined period.

45. The gateway device of claim 40 wherein said gateway establishes a Secure Sockets Layer connection with the remote client.

46. The gateway device of claim 40 wherein said authentication module uses each of said set of password-key pairs at most once.

47. The gateway device of claim 40 wherein said storage module stores a plurality of sets of password-key pairs including said set of password-key pairs, each associated with a unique user identifier.

48. The gateway device of claim 47 wherein said initialization module assigns a corresponding user identifier to the portable storage device.

49. The gateway device of claim 40 wherein secure communication between the portable storage device and said gateway device is established by location of said portable storage device within a perimeter of said trusted network.

* * * * *